United States Patent [19]

Cannelli et al.

[11] Patent Number: 5,398,217
[45] Date of Patent: Mar. 14, 1995

[54] METHOD OF HIGH-RESOLUTION SEA BOTTOM PROSPECTING AND TUNED ARRAY OF PARABOLOIDAL, ELECTROACOUSTIC TRANSDUCERS TO CARRY OUT SUCH METHOD

[75] Inventors: Giovanni B. Cannelli, Rome; Enrico D'Ottavi, Rignano Flaminio, both of Italy

[73] Assignee: Consiglio Nazionale Delle Ricerche, Rome, Italy

[21] Appl. No.: 835,901

[22] PCT Filed: Sep. 14, 1990

[86] PCT No.: PCT/IT90/00075

§ 371 Date: Feb. 27, 1992

§ 102(e) Date: Feb. 27, 1992

[87] PCT Pub. No.: WO91/04501

PCT Pub. Date: Apr. 4, 1991

[30] Foreign Application Priority Data

Sep. 15, 1989 [IT] Italy ............................... 48370/89

[51] Int. Cl.$^6$ ............................................. H04R 23/00
[52] U.S. Cl. ........................................ 367/147; 367/15; 367/142; 181/110
[58] Field of Search .............. 367/147, 15, 142; 181/110

[56] References Cited

U.S. PATENT DOCUMENTS

| | | | |
|---|---|---|---|
| 2,559,227 | 7/1951 | Rieber | 367/147 |
| 3,245,032 | 4/1966 | Knott et al. | 367/147 |
| 3,248,917 | 5/1966 | Herring, Jr. | 367/147 |
| 3,304,533 | 2/1967 | Huckabay et al. | 367/147 |
| 3,357,178 | 12/1967 | Meyers | 367/147 |
| 4,651,311 | 3/1987 | Owen et al. | 367/147 |
| 4,734,894 | 3/1988 | Cannelli et al. | 367/147 |
| 4,764,906 | 8/1988 | Clements et al. | 367/147 |

*Primary Examiner*—J. Woodrow Eldred
*Attorney, Agent, or Firm*—Townsend and Townsend Khourie and Crew

[57] ABSTRACT

A method of and an apparatus for the high-resolution sea bottom prospecting, in which an electroacoustic paraboloidal transducer is placed into water, the electrodes of which are near the focus of the paraboloid and are connected both to a capacitor bank the capacitance of which may be varied at will and to a supply circuit for the generation of an electroacoustic discharge between said electrodes. As the capacitance varies the delay time between the primary pulse or underwater prospecting pulse and the cavitation pulse is recorded at any discharge, and at the same time dominant frequency of the prospecting signal spectrum is determined. Afterwards capacitance values are set so as to provide both cavitation pulses the contribution of which to the resulting pulse is minimum and a dominant frequency spectrum as broad as possible. The preset capacitance values are assigned to a capacitor array connected each to an electroacoustic paraboloidal transducer dipped in water, the electrodes of which are supplied so as to generate the underwater prospecting pulse.

7 Claims, 4 Drawing Sheets

METHOD OF HIGH-RESOLUTION SEA BOTTOM PROSPECTING AND TUNED ARRAY OF PARABOLOIDAL, ELECTROACOUSTIC TRANSDUCERS TO CARRY OUT SUCH METHOD

BACKGROUND OF THE INVENTION

This invention relates to a method of sea bottom prospecting through the generation of submarine acoustic pulses having time characteristic and spectrum adapted to a high-resolution prospecting, and a tuned array of paraboloidal electroacoustic transducers to carry out such method.

The described apparatus can be advantageously used for the prospecting of the sea bottom structure and the subsurface of the sea bottom both in civil engineering and archaeological research and in geophysical applications as well. Furthermore, it can be used for the prospecting of lakes or in any natural body of water. Generally the apparatus of this invention can be advantageously used in all of applications of submarine acoustics in which a high acoustic power with high resolution is needed in the low and medium frequency range (0.1 to 15 kHz) not covered by the traditional acoustic devices like SONAR.

Most of the traditional sources for the sea prospecting have only a few of the necessary requirements to generate high-resolution prospecting pulses because the frequency band thereof is rather limited and the high frequency harmonic content is poor. Moreover the cavitation pulse associated to the primary pulse further reduces the feasibility of a good performance of the sources. The criteria for judging of the quality of a seismic sea-source are essentially based upon the duration of the acoustic pulse, the frequency content and the repeatability thereof, and the primary/cavitation pulse ratio (see G. Parkes and L. Hatton, The Marime Seismic Source, D. Reidel edition 1986, Dordrecht, Holland).

As for the first two characteristics, i.e. duration of the acoustic pulse and frequency content, the ideal signal would be a socalled "spike" or pulsed signal which can be represented by a Dirac delta function, i.e. a very short pulse in which all frequencies are contained (see M. B. Dobrin, Introduction to Geophysical Prospecting, Mc Graw-Hill, 1960, New York). The cavitation pulse (see A. Prosperetti, Physics of Acoustic Cavitation, Rendiconti Società Italiana Fisica, 1984, Varenna), is a drawback always present in seismic underwater prospecting which, however, can be eliminated in a digital signal processing, for example, by deconvolution techniques (see E. A. Robinson and S. Treitel, Geopnysical Signal Analysis, Prentice-Hall, Inc., 1980, Englewood Cliffs). Nevertheless a prospecting pulse is desired which is similar as far as possible to the ideal signal before any digital processing of the seismic signal. This is the necessary condition to obtain high-resolution "acoustic images", thus minimizing cost and waste of time during the signal processing.

SUMMARY OF THE INVANTION

The method and apparatus of the present invention have important features the above mentioned problem. They are based upon experimental examinations carried out by the inventors in underwater acoustic tests using an already known paraboloidal electroacoustic transducer which in the object of a previous patent of the same inventors (see G. B. Cannelli, E. D'Ottavi and S. Santoboni, Electroacoustic Pulse Source For High Resolution Seismic Prospecting, Italian Pat. No. 49127-A/84 filed on 23.10.84).

The inventors have preferred this type of transducer with suitable modifications as a basic component of the apparatus of the present invention because it is provided with such a versatility as to allow various experiments to be carried out under different conditions. Therefore, the electrical and mechanical parameters can be easily modified in such transducer in order to provide acoustic waves having different characteristics which cannot be provided by other known devices of sea bottom prospecting (see G. B. Cannelli, E. D'Ottavi, M. Gasperini, First Resuits of Sea Bottom Prospecting With Paraboloidal Acoustic Sources, VI national Meeting About Earth Geophysics, 1988, CNR Rome).

In the above mentioned paraboloidal transducer the acoustic wave is generated by an electrical high energy discharge which is provided between two electrodes which are placed near the focus of the paraboloidal reflector filled with a suitable liquid and are connected to a capacitor bank supplying the electrostatic energy. When the potential difference of the discharge between the electrodes is determined, a suitable device allows the capacitance values to be modified, thus providing the electrostatic energy for the electrical discharge and determining accordingly the energy of the emitted acoustic energy and the characteristic of the relative frequency spectrum. Notwithstanding its versatility the above mentioned paraboloidal transducer provides some problems which are common to all underwater acoustic sources, i.e. cavitation pulse and limited frequency spectrum.

In order to avoid the above mentioned problems the inventors have devised a method and apparatus which utilize the above paraboloidal transducer connected, however, to a suitable circuit and tuned on different values of electrical capacitance as explained afterwards.

The method and apparatus have been conceived on the basis of research by the inventors who have established that:

a) the delay time between the primary and the cavitation pulse is a function of the electrostatic energy. That is to say, once determined the potential difference between the electrodes of the paraboloidal transducer, the delay time increases as the capacitance raises according to a function $\tau = f(C)$, where $\tau$ is the delay time and C is the electrical capacitance;

b) the dominant frequency of the spectrum of the acoustic pulse (i.e. the harmonic component with the highest amplitude) is also a function of the capacitance according to a function of the type $v_m = f(C)$, where $v_m$ is the dominant frequency and C is the electrical capacitance. In particular, the dominant frequency increases as the electrical capacitance decreases.

Taking advantage of the synergic action of the two electroacoustic effects the inventors have devised and provided a system of 10 paraboloidal transducers associated to one another and connected according to a suitable electrical circuit so as to be tuned on different values of selected electrical capacitances. Thus the primary acoustic pulses which can be synchronized with great precision are summed constructively to disadvantage of the cavitation pulse which are properly shifted as the electrical capacitance varies. Furthermore the primary pulses contribute to the frequency spectrum with different dominant frequency, thus causing a wider spectrum than that corresponding to a single transducer.

The advantages ensuing from the apparatus of the present invention are considerable. In fact at any "shot" the apparatus acts so that the resulting acoustic pulse is considerably improved with respect to the pulse of the single transducer above all as far as the following features are concerned:
amplification of the primary pulse;
broadening of the frequency band;
increasing of the primary/cavitation signal ratio.
Thus the most important requirements are fulfilled to obtain an optimum high resolution sea source.

Further features and advantages of the method and the apparatus of the present invention will be better explained in the following description of a non-limitative preferred embodiment of the invention.

DESCRIPTION OF THE PREFERRED EMBODIMENT

Figure 1:
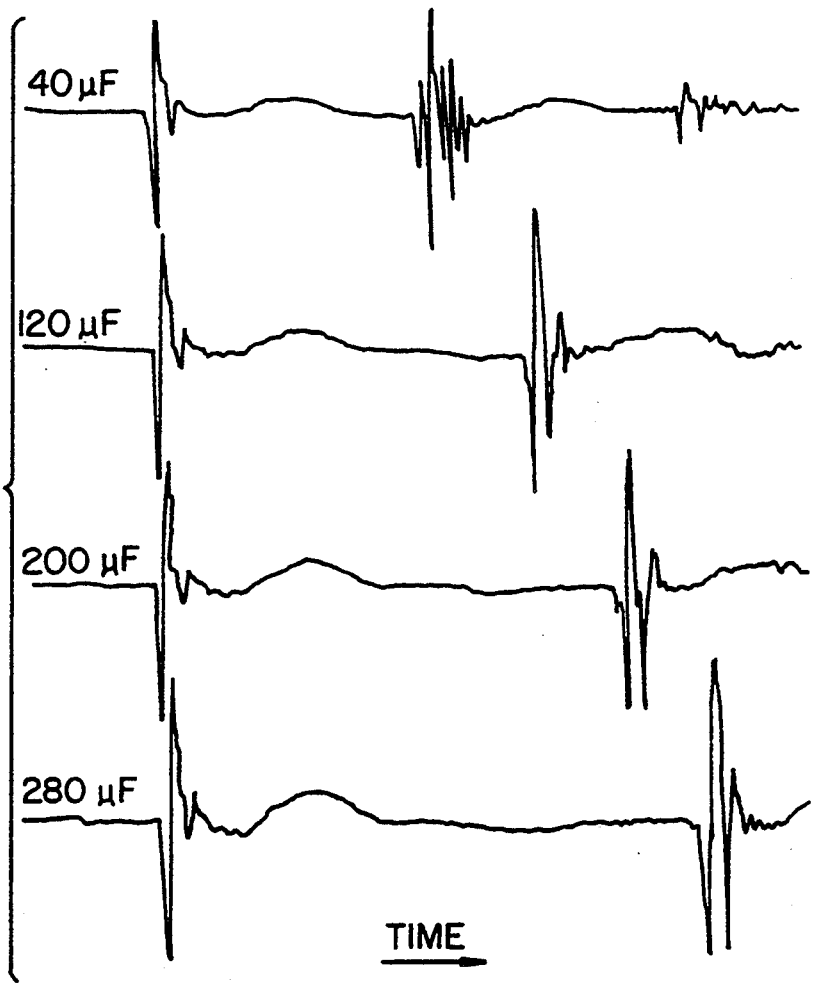
FIG. 1 shows a sequence of the cavitation phenomenon as the electrical capacitance used to generate the acoustic prospecting wave by means of a single paraboloidal transducer varies.
Figure 2:
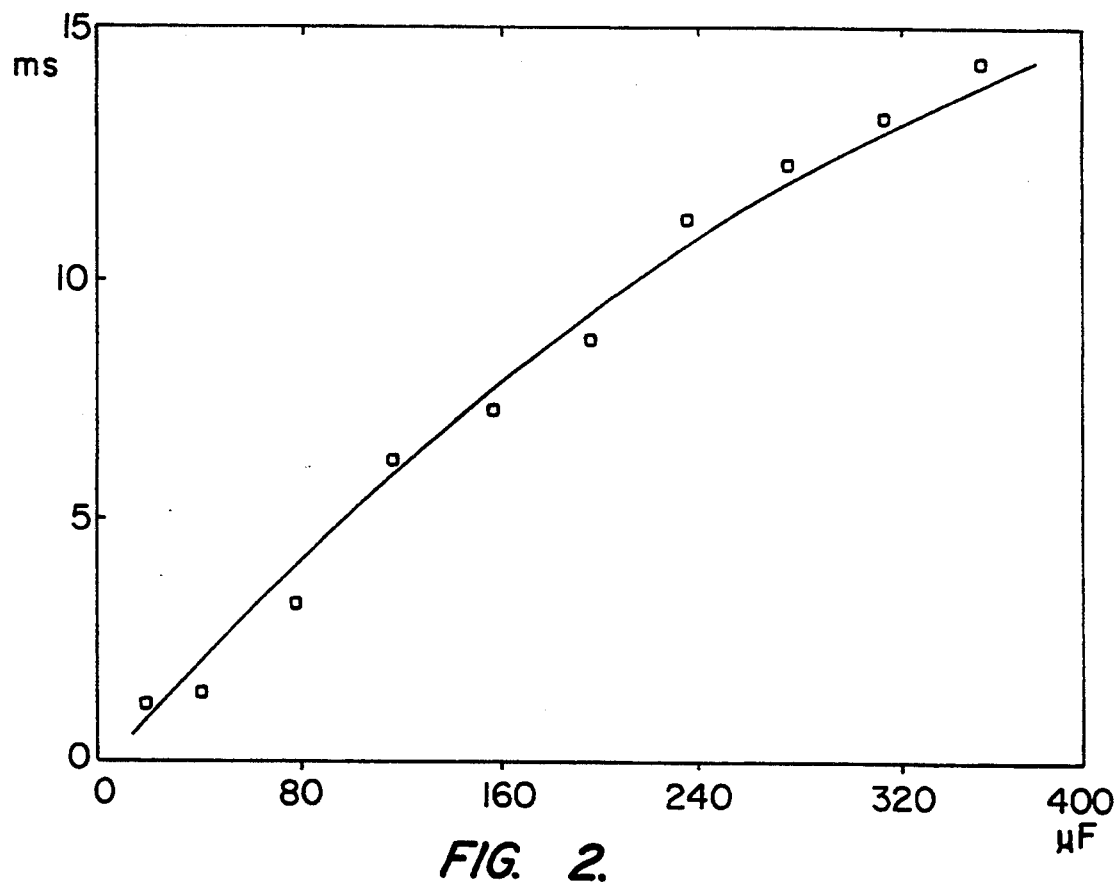
FIG. 2 shows quantitatively the electroacoustic phenomenon of FIG. 1 by a diagram in which the delay time between the primary pulse and the cavitation pulse is the ordinate and the electrical capacitance is the abscissa.
Figure 3:
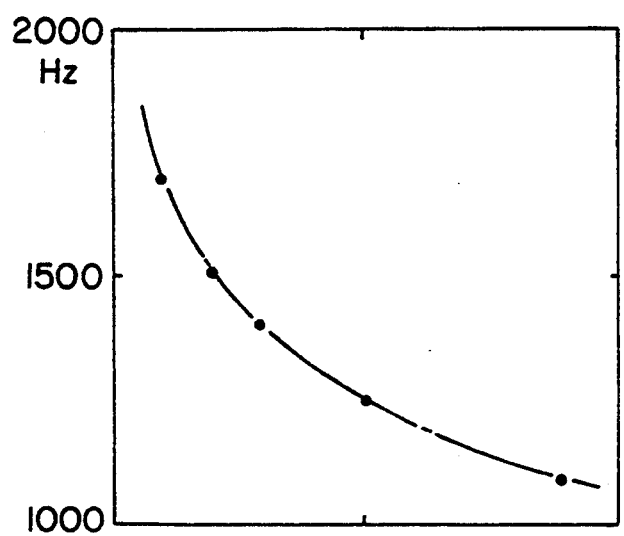
FIG. 3 shows a diagram of the dominant frequency of the prospecting pulse as a function of the electrical capacitance.

The principle upon which the present invention is based is illustrated in FIGS. 1 to 3 showing the diagrams resulting from the experimental researches conducted by the inventors in a series of tests using as starting point the paraboloidal transducer conveniently modified for the underwater prospecting. The modification of the preceding prototype relates to the striking of the electrical discharge in the transducer. In the present invention the electrical discharge is provided directly in the water, which can be salt-water or soft-water according to the application field in which the paraboloidal transducer is dipped, and is triggered off by an air spark generator acting as switch as better explained with reference to FIG. 5. In the above mentioned preceding type the striking was provided by a third electrode between the main electrodes in order to ionize the insulating liquid contained in the paraboloidal transducer and held by a neoprene diaphragm closing the base.

With reference to the single paraboloidal transducer suitably modified as mentioned above the acoustic pulses shown in FIG. 1 as a function of the time have been provided. Each signal corresponds to a single "shot" effected with the paraboloidal transducer at a predetermined capacitance value. In FIG. 1 four "shots" are shown in a sequence by way of example, said shots corresponding to the capacitance values: 40 $\mu F$, 120 $\mu F$, 200 $\mu F$ and 280 $\mu F$. The delay time between the primary pulse and the cavitation pulse is a function of the energy or of only the capacitance once determined the potential difference between electrodes. This phenomenon is better illustrated in a quantitative way in the diagram of FIG. 2 showing as the delay time increases when the capacitance increases. This diagram has been used to select the most suitable values of capacitance to be assigned to the single components of the apparatus which is the object of the present invention in order that the cavitation pulses are suitably shifted so that the contribution thereof is negligible with respect to the resulting primary signal which is instead provided by the constructive contribution of the single primary pulses which can be synchronized.

FIG. 3 shows an electroacoustic effect simultaneous to that shown in FIGS. 1 and 2. The dominant frequency of the spectrum of the primary pulse, i.e. the harmonic component having the highest amplitude value is also a function of the capacitance and increases as the capacitance decreases. This means that the acoustic pulse resulting from the simultaneous "shot" of the 10 paraboloidal transducers forming the apparatus of the invention will have a much wider frequency spectrum than that corresponding to the single transducers.

Figure 4:
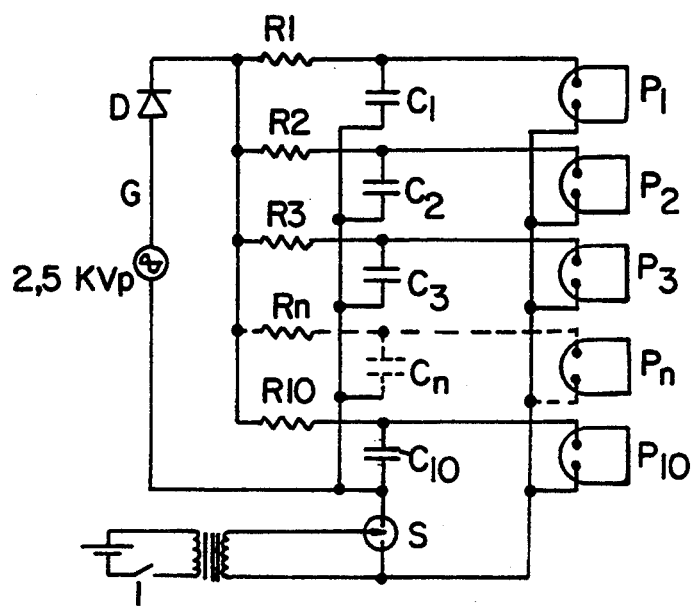
FIG. 4 shows the principle diagram of the supply circuit of the 10 paraboloida transducers of the present invention.

The use of both electroacoustic effects to provide an optimum acoustic pulse for the underwater prospecting is illustrated in the diagram of FIG. 4 showing the supplying of ten paraboloidal transducers indicated at $P_1$ to $P_{10}$ belonging to the apparatus of the present invention. Generator G supplies an alternate voltage of 1.773 $kV_{rms}$ which allows all capacitors $C_1-C_{10}$ to be charged at the peak voltage of 2.5 kV through diode D and resistors $R_1-R_{10}$. The stored electrostatic energy and then the electrical capacitances $C_1-C_{10}$ have been selected so as to suitably shift the cavitation pulses from one another according to the characteristic of the diagram of FIG. 2. The high voltage resistors $R_1-R_{10}$ are calculated so as to provide the same time constant ($\tau \simeq 200$ ms) for all RC-pairs in order to assure a perfect synchronism among the ten paraboloidal elements for the apparatus which will operate simultaneously when switch I is closed. The allowed rate of repetition of the "shots" has a maximum value of a pulse per second if a potential difference of 2.5 kV is applied. Such rate can be increased by using a lower potential difference. In such a case the time shift between the primary pulse and the cavitation pulse will be reduced accordingly, even if it remains different for any paraboloidal transducer. Switch I operates when it is closed an air spark generator S which in turn triggers off the electrical discharge between the electrodes of the single paraboloidal transducers $P_1-P_{10}$.

Figure 5:
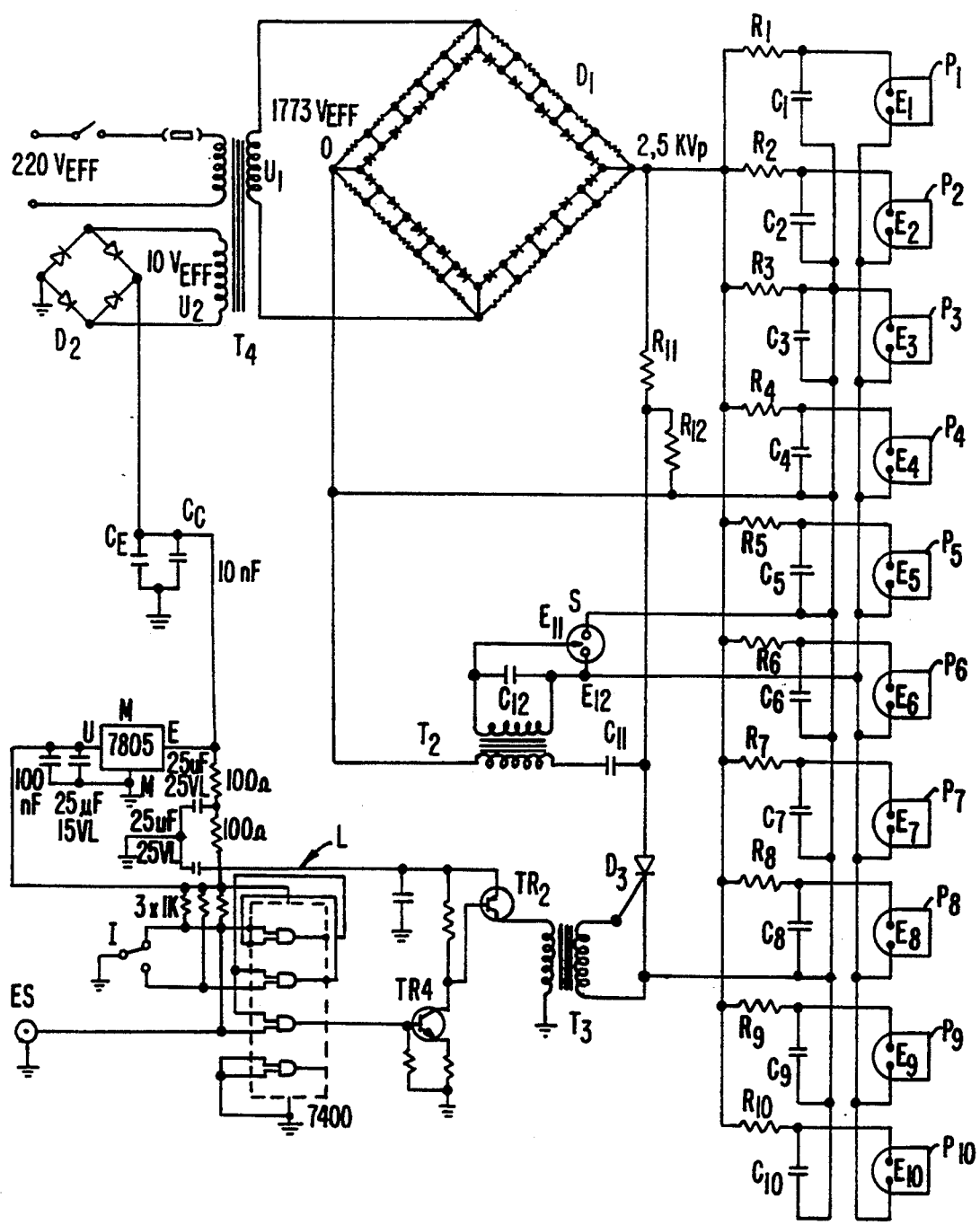
FIG. 5 is an electrical circuit diagram showing the electrical connection between the various components of the apparatus of the present invention.

Illustrated in FIG. 5 is the detailed electrical diagram showing the electrical connections among the various components of the apparatus of the present invention. Transformer $T_1$ supplied with the line voltage at its input terminals supplies at its output two voltages.

The first voltage of 1.773 $kV_{rms}$ supplied at the output winding $U_1$ is rectified by a diode bridge $D_1$ formed for example of twenty elements 40HF160 and is then used to charge the ten capacitors $C_1-C_{10}$ associated to each paraboloidal transducer $P_1-P_{10}$, respectively. Transducers $P_1-P_{10}$ are formed each by a paraboloidal hollow body having an open base, in the focus of which two electrodes $E_1-E_{10}$ are installed, respectively, the first one being connected to the respective associated capacitors $C_1-C_{10}$, the second one being connected to any second electrode, all of the latter being connected to air-spark generator S.

The second voltage of 10 $V_{rms}$ supplied at the output winding $U_2$ is fed through a second diode bridge $D_2$ and a voltage regulator M to the electrical discharge control logic L. Connected between diode bridge $D_2$ and regulator M are an electrolytic capacitor $C_E$ for chopping the low frequency component and capacitor $C_c$ in parallel for compensating the distributed inductance of the electrolytic capacitor $C_E$. The control can be effected manually by opening and closing switch I or automatically by a suitable outer programmed pulse source ES.

When switch I is manually closed or when an electrical pulse is supplied by the outer source ES, control logic L supplies its output signal to power amplifier $TR_1$ and to current amplifier $TR_2$, the output of which is supplied to diode SCR $D_3$ through decoupling transformer $T_3$. Thus diode SCR $D_3$ is conductive and causes capacitor $C_{11}$ connected to its output to discharge through the primary of transformer $T_2$ which generates in the secondary a high voltage charging output capacitor $C_{12}$ in parallel with electrodes $E_{11}$ and $E_{12}$ of air spark generator S which is connected, as mentioned above, to the second electrodes of the ten paraboloidal transducers $P_1-P_{10}$. In the air spark generator S, each time the voltage between the electrodes $E_{11}$ and $E_{12}$ connected to the secondary of transformer $T_2$ overcomes a predetermined value, a spark is generated which ionizes the medium and allows generator S to act as a closed switch, thus generating an electrical high energy discharge simultaneously in the ten paraboloidal transducers $P_1-P_{10}$. Capacitor $C_{12}$ has the function to increase the power of the sparks, while the voltage divider formed of the resistors $R_{11}$ and $R_{12}$ has the function of dividing the voltage between the output of the diode bridge $D_1$ and the output of spark generator S.

Electrical capacitance $C_1-C_{10}$, the values of which are conveniently selected for example at intervals of 40 $\mu F$ starting from 20 $\mu F$ up to 380 $\mu F$, are associated to ten paraboloidal transducers $P_1-P_{10}$. The selection of the capacitances is such as to shift each other the cavitation pulses and supply at the same time ten different values of dominant frequencies according to the diagrams of FIGS. 2 and 3, respectively. The corresponding resistances $R_1-R_{10}$ have been calculated so as to provide the same time constant (for example $\tau = 200$ ms) for any RC-pairs in order to assure a perfect synchronism among the ten paraboloidal elements $P_1-P_{10}$ of the apparatus which will provide simultaneously a pulse each time switch I is closed. The resulting acoustic pulse will be considerably improved with respect to the pulse of the single paraboloidal transducer because an amplification of the primary pulse, a broadening of the frequency band and an increasing of the primary/cavitation signal ratio are provided.

The versatility of the present apparatus is such as to comply with different prospecting requirements by easy modifications of its electrical parameters. For example, for deep explorations lower frequencies and greater acoustic powers can be used. This involves the use of suitably higher capacitances. On the contrary, for shallow explorations higher frequencies and moderate powers provided by means of lower capacitances can be used.

Figure 6A:
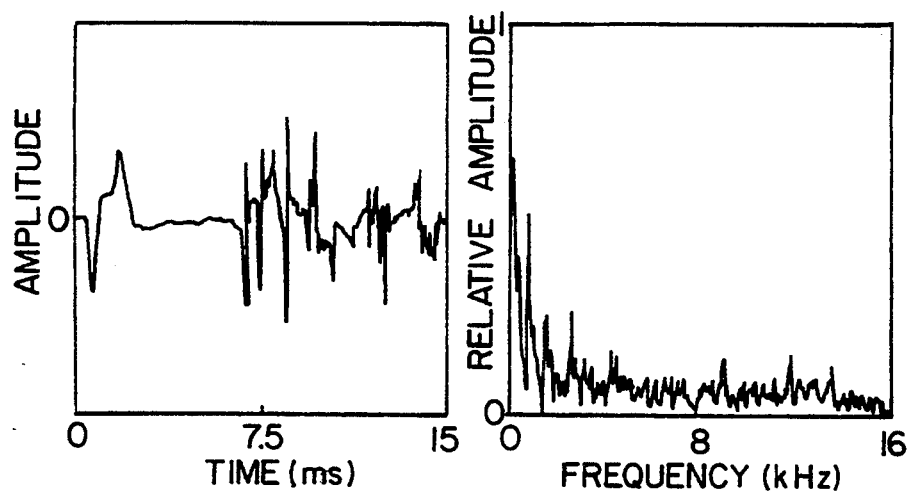
FIGS. 6a and 6b show a comparison in the time and frequency domain, between the signal generated by a traditional spark array (FIG. 6a) and that of the apparatus of the present invention (FIG. 6b) under the same experimental conditions (at 5 m from the source and with electrostatic energy E=1000 Joule).
Figure 6B:
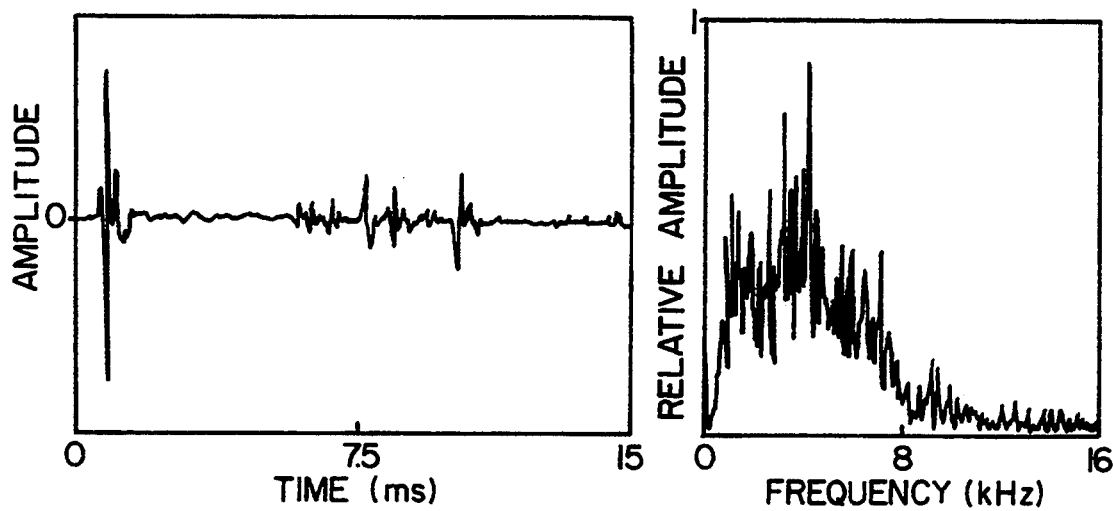

In order to illustrate the advantages of this invention, the results of two experiments performed with the present apparatus and a commercial device are shown in FIGS. 6a and 6b, respectively.

It should be noted that the signal generated by the present apparatus (FIG. 6b) exhibits in the time domain (left diagram) a primary pulse much higher than those due to cavitation. On the contrary, the corresponding signal of the commercial spark array (FIG. 6a) has a cavitation pulse larger than the primary one. Also the comparison in the frequency domain (right diagrams) shows a remarkable difference between the two devices. Only the apparatus of the present invention exhibits suitable intense high frequency components to allow high resolution prospectings.

We claim:

1. A method of high-resolution sea-bottom prospecting with electroacoustic paraboloidal transducers having first and second electrodes near their foci comprising the steps of:
   a) providing in water an electroacoustic paraboloidal transducer and connecting its electrodes to a predetermined voltage generator and a capacitor bank having capacitances selectable to suitably shift cavitation pulses from one another according to the characteristics of a given experimental diagram;
   b) adjusting a capacitance value of the capacitor bank;
   c) generating an electric discharge between the electrodes of the transducer produced by electrostatic energy stored in the capacitor bank having said capacitances;
   d) producing an acoustic wave pulse signal in the water from the electric discharge in the paraboloidal transducer;
   e) supplying the pulse signal to a signal recording means and to a signal spectrum analyzer means;
   f) determining a delay time between the pulse signal and a secondary cavitation pulse in the form of a time signal provided by said recording means;
   g) determining a dominant frequency in the spectrum of the pulse signal;
   h) repeating steps c) to g) for further adjusted capacitance values;
   i) determining a mutual relation function of the delay times and the dominant frequencies with respect to the adjusted capacitance values and plotting diagrams reflecting delay time-capacitance and dominant frequency-capacitance;
   j) selecting predetermined capacitance values for a predetermined number of paraboloidal transducers to provide the delay times of the secondary cavitation pulses and thereby reduce the contribution of the secondary cavitation pulses to a resulting signal and distribute the dominant frequencies to enlarge the spectrum of the resulting signal.

2. An apparatus for high-resolution sea-bottom prospecting comprising:
   a generator for supplying a voltage;
   an array of paraboloidal transducers each formed of a hollow open-base paraboloid in a liquid having first and second electrodes disposed near the focus of the paraboloid, the second electrodes of each transducer being connected to one another;

a capacitor bank having capacitors with different capacitances, each capacitance selectable to suitably shift cavitation pulses from one another according to the characteristics of a given experimental diagram, the capacitors each having first and second terminals, the first terminals being operably connected to the first electrodes;

an air-spark generator having a first arc electrode connected to the second electrodes of the transducers and a second arc electrode connected to the second terminals of the capacitors, the air-spark generator being adapted to respond to a change in capacitance value of the capacitor bank and strike an arc between the first and second arc electrodes from electrostatic energy stored in the capacitors to produce an electric discharge in the liquid around each paraboloid, the electric discharge generating an acoustic wave pulse signal;

a signal recorder coupled to each paraboloid for determining a delay time between the pulse signal and a secondary cavitation pulse;

a signal spectrum analyzer coupled to the signal recorder for determining a dominant frequency in the spectrum of the pulse signal; and means, coupled to the spectrum analyzer, for determining a mutual relations function for the delay times and the dominant frequencies, the determining means being adapted to plot diagrams reflecting delay time-capacitance and dominant frequency-capacitance based on the mutual relation function and to select predetermined capacitance values for a predetermined number of the paraboloidal transducers to provide the delay times of the secondary cavitation pulses and thereby minimize the contribution of the secondary cavitation pulses and distribute the dominant frequencies so that the spectrum can be enlarged.

3. The apparatus of claim 2 further comprising a plurality of resistors, each resistor being connected to a capacitor in the capacitor bank to form an RC-pair having a time constant, each resistor having a resistance value selected so that the time constant of all of the RC-pairs is equal.

4. The apparatus of claim 3 wherein the time constant is 200 ms.

5. The apparatus of claim 2 wherein the array of paraboloidal transducers comprises ten transducers.

6. The apparatus of claim 2 wherein the capacitances of the capacitors have an increasing value from 20 $\mu$F to 380 $\mu$F by an arithmetical progression with a rate of 40 $\mu$F.

7. The apparatus of claim 2 further including a diode bridge connected to each RC-pair, the diode bridge being adapted to provide a potential difference that generates a pulse repetition frequency of one pulse per second.

* * * * *